Figure 1:
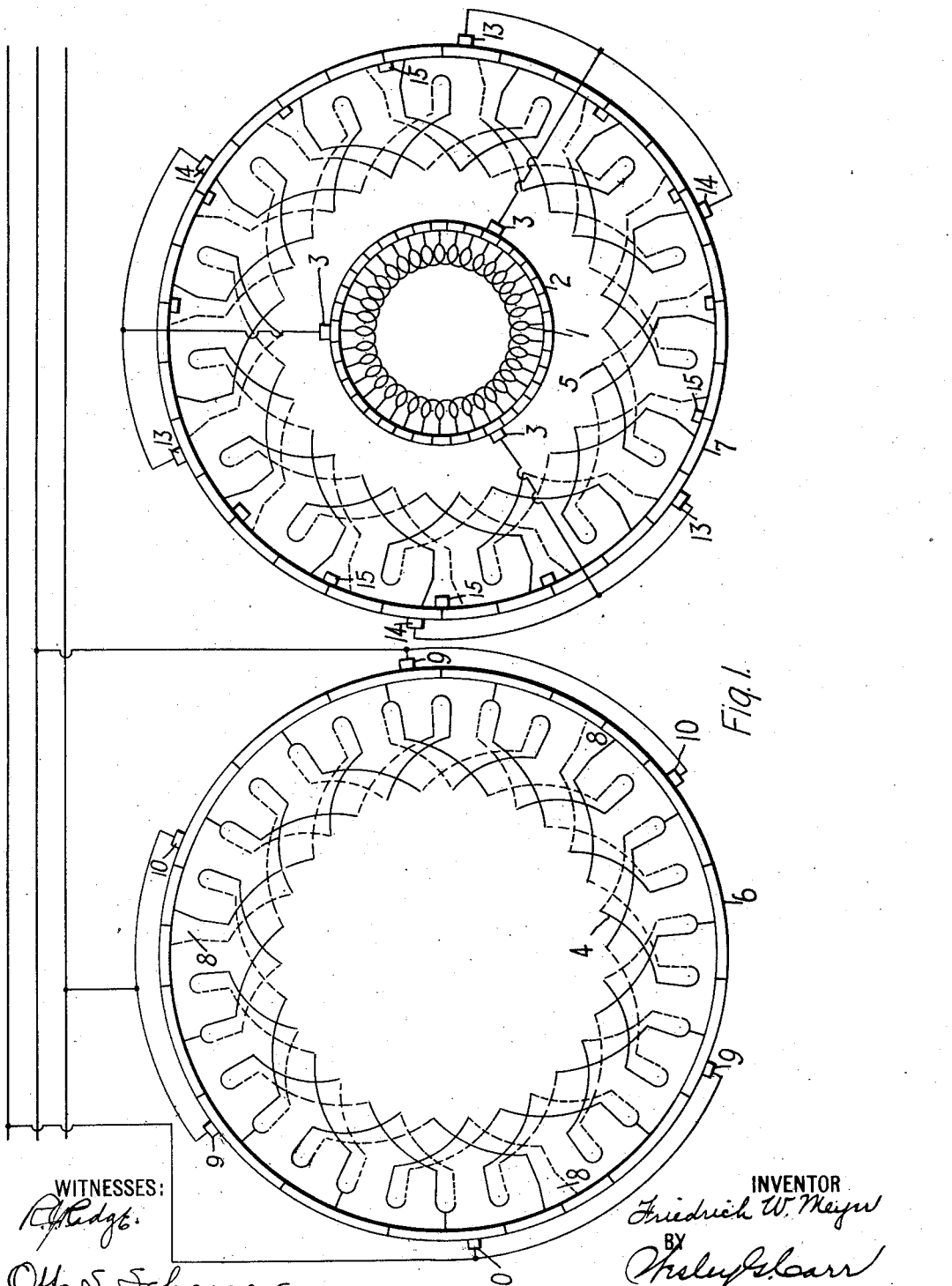

F. W. MEYER.
ALTERNATING CURRENT COMMUTATOR MOTOR.
APPLICATION FILED JAN. 11, 1913.
1,170,657.
Patented Feb. 8, 1916.
2 SHEETS—SHEET 2.
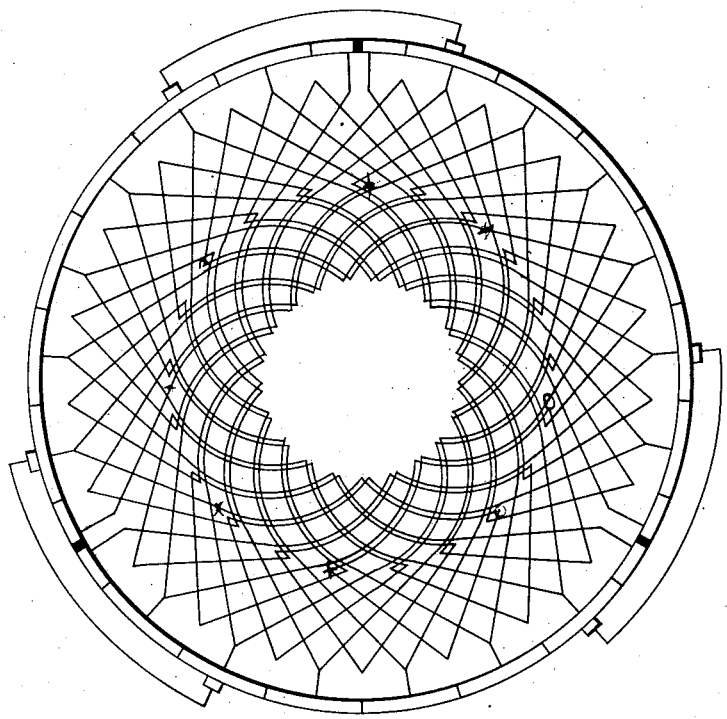
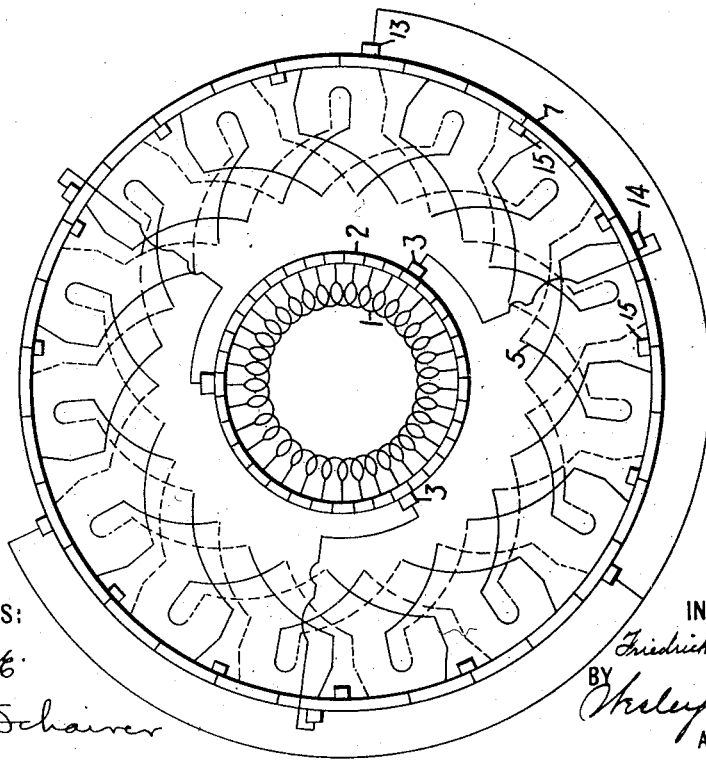
WITNESSES:
INVENTOR
Friedrich W. Meyer
BY
ATTORNEY

UNITED STATES PATENT OFFICE.

FRIEDRICH W. MEYER, OF WILKINSBURG, PENNSYLVANIA, ASSIGNOR TO WESTINGHOUSE ELECTRIC AND MANUFACTURING COMPANY, A CORPORATION OF PENNSYLVANIA.

ALTERNATING-CURRENT COMMUTATOR-MOTOR.

1,170,657.   Specification of Letters Patent.   Patented Feb. 8, 1916.

Application filed January 11, 1913. Serial No. 741,460.

*To all whom it may concern:*

Be it known that I, FRIEDRICH W. MEYER, a subject of the Emperor of Germany, and a resident of Wilkinsburg, in the county of Allegheny and State of Pennsylvania, have invented a new and useful Improvement in Alternating-Current Commutator-Motors, of which the following is a specification.

My invention relates to polyphase alternating current commutator motors, and it has for its object to provide a motor of this character, the speed and power factor of which may be separately regulated without causing material distortion of the rotating field form from a sine wave.

In another application, Serial No. 653,380, filed October 7, 1911, I have disclosed and covered a polyphase commutator motor in which the number of active convolutions in the several phase divisions of the field winding, and the positions thereof relatively to the stator and commutator brushes, may be separately adjusted for the purpose of regulating the speed and power factor respectively of the motor.

The present invention is an improvement over that set forth in the said application, and provides simple and effective means whereby the directions and magnitudes of, and the phase angles between, the vectors representing the voltages applied respectively to the stator and armature may be separately regulated, as desired, in a very convenient manner, thereby avoiding distortion of the field form.

My invention is illustrated in the accompanying drawings, Figure 1 of which is a diagrammatic view of a motor embodying the same. Fig. 2 is a similar view of a modification of the connections between one of the field windings and the armature of the motor, and Fig. 3 is a diagrammatic view of a modified form of the field winding of the motor.

The present motor comprises an armature 1 having a winding that is connected in the usual manner to the segments of a commutator cylinder 2 upon which brushes 3 bear. The armature is surrounded by a stator or field member that is provided with two windings 4 and 5, that, for the sake of simplicity and clearness of illustration, are here shown as arranged side by side, but which, in a practical structure, will be placed upon the same magnetizable core member so as to be inductively related. In order to further simplify the illustration of the invention, and to thereby facilitate an understanding thereof, the stator windings are shown in Figs. 1 and 2 as of the ring type, but the invention may also, and preferably will, be employed in connection with windings of the drum type, as shown in Fig. 3. The two stator windings are preferably similar and are in the form of progressive lap and wave windings, alternate coils of which are respectively connected to the segments of two stationary commutator cylinders 6 and 7. The segments of the commutator cylinder 6 are connected to the coils of the stator winding 4 without opening any of the coils except three (8) that are equally spaced apart and the two parts of which are connected to adjacent commutator segments. The openings in the said coils serve to fix the positions of the several phase divisions of the stator winding. The commutator cylinder 6 is engaged by three pairs of brushes 9 and 10 respectively, the members of each pair being connected together, and the pairs being respectively connected to the conductors of a suitable supply circuit 12. The brushes 9 and 10 may be rotated without changing their relative positions, in which case only the positions of the active portions of the several phase divisions of the winding will be changed. However, if the brushes 9 and 10 are caused to approach or separate, the numbers of active convolutions in the several phase divisions of the stator winding will be changed.

The stationary commutator cylinder 7 differs from the commutator 6 in that it is provided with a larger number of segments, and the stator winding 5 differs from the winding 4 in that alternate coils are opened and the two parts thereof are respectively connected to adjacent commutator segments. The commutator cylinder 7 is engaged by three pairs of brushes 13 and 14, the members of each pair of which may be connected together and the pairs respectively connected to the commutator brushes 3, as shown in Fig. 1, or, if desired, the brushes 13 may all be connected together, and the brushes 14 respectively connected to the armature brushes 3, as shown in Fig. 2. In the former case, the several phase divisions of the winding are connected in delta relation, and, in the latter case, they are connected in star relation. The commutator cylinder 7 is also engaged by a set of brushes 15 that are adapted to electrically connect adjacent commutator segments for the purpose of connecting the several coils of the winding in series relation. In this case, there are three less than enough brushes to span alternate spaces between the commutator segments, in order to thereby provide for disconnection between the several phase divisions of the winding. If the brushes 13 and 14 are rotated without changing their relative positions and without changing the positions of the brushes 15, the positions of the active portions of the stator winding 5 will be correspondingly rotated, and if the brushes 13 and 14 are moved toward or away from each other, while maintaining the brushes 15 stationary, the numbers of active convolutions in the stator winding 5 will be regulated. In these respects, the stator winding 5 and commutator cylinder 7, and the brushes 13 and 14 have the same functions as the corresponding parts associated with the winding 4. However, the brushes 15 that engage the commutator cylinder 7 provide additional means for regulating the positions of the active portions of the several phase divisions of the stator winding 5. This arrangement has the advantage that there is no limitation as to the degree to which the positions of the active portions of the several phase divisions of the winding may be regulated and also that the wire of the winding will be used more economically.

It will be understood that the regulation of the machine may, if desired, be effected by either or both of the regulators shown in connection with Fig. 1, and that in some cases it may be found desirable to employ a regulator in connection with only one of the stator windings.

Since the numbers of active convolutions of the several phase divisions of each stator winding and the positions thereof relatively to the stator itself and to each other, may be separately regulated, it is obvious that the present invention provides means whereby the directions and magnitudes of, and the phase angles between, the vectors representing the voltages applied to the stator and armature may be conveniently adjusted to affect speed regulation of the motor and to cause its power factor to assume substantially any desired value, and that because of the special arrangement of the windings employed, this regulation may be effected without materially distorting the form of the rotating field from a sine wave.

The winding shown in Fig. 3 is of the ordinary lap and wave drum type such as is commonly employed upon the armatures of electrical machines, and it is connected to the stationary commutator in the same manner as the windings of Figs. 1 and 2. This will be clearly understood from an examination of Fig. 3.

The present form of winding and regulator may, of course, be applied by those skilled in the art to machines having substantially any desired characteristics, such as of shunt, series and compound machines.

If the armature of the present motor is connected directly to the supply circuit, it is necessary to employ only one stator winding which will also be connected to the supply circuit and may be employed for regulating both the speed and power factor of the motor.

I claim as my invention:

1. An alternating current commutator motor comprising a plurality of inductively related lap and wave stator windings, an armature having a commutator cylinder, brushes bearing on the commutator cylinder and adjustably connected to one of said field windings.

2. An alternating current commutator motor comprising a plurality of inductively related lap and wave stator windings, an armature having a commutator cylinder, brushes bearing on the commutator cylinder, and means for adjustably connecting the said brushes to alternate coils of one of said stator windings.

3. An alternating current commutator motor comprising a plurality of inductively related lap and wave stator windings, each comprising a plurality of phase divisions; an armature that is adjustably connected to one of said windings, and means for adjusting the relative positions of the corresponding phase divisions of the said stator windings.

4. An alternating current commutator motor comprising a plurality of inductively related lap and wave stator windings, each comprising a plurality of phase divisions, an armature that is connected to one of the said stator windings, and means for adjusting the numbers of active convolutions in, and the relative positions of, the corresponding phase divisions of the said windings.

5. The combination with an alternating current supply circuit, of a motor comprising electrically unconnected but inductively related primary and secondary stator windings, the primary winding of which is connected to the supply circuit, an armature that is connected to the secondary stator winding, and means for adjusting the relative positions of the active portions of the several phase divisions of the said windings.

6. An alternating current commutator motor comprising a lap and wave stator winding, a commutator connected to alternate coils of said winding, and relatively movable brushes engaging said commutator.

7. An alternating current commutator motor comprising a progressive stator winding, a commutator connected to said winding, and two sets of brushes engaging said commutator and movable relatively thereto, one set being adapted to span alternate spaces between adjacent commutator segments.

8. An alternating current commutator motor comprising a progressive stator winding, a commutator connected to said winding, and two sets of brushes engaging said commutator and movable relatively thereto, one set being adapted to span all but three of alternate spaces between adjacent commutator segments.

In testimony whereof, I have hereunto subscribed my name this 31st day of December 1912.

FRIEDRICH W. MEYER.

Witnesses:
OTTO S. SCHAIRER,
B. B. HINES.